United States Patent
Dahl

[19]
[11] Patent Number: 6,076,676
[45] Date of Patent: Jun. 20, 2000

[54] METHOD AND APPARATUS FOR PACKAGING LARGE CAKES

[75] Inventor: Robert S. Dahl, Paso Robles, Calif.

[73] Assignee: Cako Development Corporation, Paso Robles, Calif.

[21] Appl. No.: 09/080,979

[22] Filed: May 19, 1998

[51] Int. Cl.[7] .............................. B65D 73/00; B65D 6/28; B65D 45/16; A23B 1/00
[52] U.S. Cl. ...................... 206/467; 426/106; 426/128; 220/4.01; 220/324
[58] Field of Search .................... 426/106, 128; 206/467; 220/4.01, 324

[56] References Cited

U.S. PATENT DOCUMENTS

| | | | |
|---|---|---|---|
| 1,446,782 | 2/1923 | Broun et al. | 426/128 |
| 2,359,996 | 10/1944 | Krunkel | 220/324 |
| 3,690,902 | 9/1972 | Dahl . | |
| 4,452,356 | 6/1984 | Dahl | 206/467 |
| 4,699,291 | 10/1987 | Prais et al. | 206/467 |
| 4,705,163 | 11/1987 | James | 426/128 |
| 4,867,303 | 9/1989 | Beckerman et al. | 426/128 |
| 5,573,741 | 11/1996 | Riley | 220/324 |

FOREIGN PATENT DOCUMENTS

| | | | |
|---|---|---|---|
| 353099 | 7/1931 | United Kingdom | 220/324 |
| 2224301 | 2/1990 | United Kingdom | 220/324 |

*Primary Examiner*—Anthony J. Weier
*Attorney, Agent, or Firm*—Gunn, Lee & Keeling

[57] ABSTRACT

A cake package for packaging large and heavy cakes is shown with a cake base, a cake cover, two slits cut into the bottom side of the cake base along the corrugation of the board, and at least two flexible, reusable spring loaded clips. To assemble the present invention, a cake is first mounted to the cake base in the conventional manner. Then, the cake cover is attached to the cake base by using food grade glue or any other conventional method. Finally, the clips are mounted into place by securing the upper part of the clips to the cake cover and by securing the lower part of the clips into the slits located at the bottom of the cake cover. The clips stay in place due to the rigidity of their material.

1 Claim, 3 Drawing Sheets

METHOD AND APPARATUS FOR PACKAGING LARGE CAKES

BACKGROUND OF THE INVENTION

1. Field of the Invention

Applicant's invention relates to the field of food packaging, and more specifically, to a method and apparatus of packaging large and heavy cakes on a tray under a clear plastic cover.

2. Background Information

Presently, many cakes are packaged by placing the cake onto a base made of corrugated cardboard and then covering the cake by using a plastic see-through cover releasably fastened to the base by either using glue or by using various combinations of interlocking grooves and flange-like extensions molded into the base and the plastic see-though cover.

U.S. Pat. No. 3,770,115 for packaging container for pies discloses a method of attaching a container cover to a base by means of a groove around the edge of the inside perimeter of the cover. The groove interfaces with the horizontally extending flange located at the upper lip of the base. To fasten the cover to the base, the practitioner simply guides the horizontally extending flange into the groove until the entire perimeter of the flange snaps into place and rests snugly against the inside surface of the groove.

The container disclosed in U.S. Pat. No. 1,978,296 also uses similar means to fasten the cover to the base. In addition, U.S. Pat. No. 1,978,296 also discloses of a method for attaching the cover to the base by molding several beads or inwardly extending tabs to the cover. When the cover is affixed to the base, the beads or tabs rest snugly against the bottom side of the flange that forms the lip of the base, thereby preventing the cover from being lifted upward without the person first having to exert a certain amount of force on the cover. U.S. Pat. No. 3,837,526 also discloses similar means of attaching the cover to the base.

U.S. Pat. No. 2,246,695 uses a combination of grooves and beads to attach the cover to the base. The horizontally and outwardly extending flanges at the mouth of the base is snapped into a groove located near the bottom edge of the cover. For additional security, the edge of the cover forms an inwardly extending reinforcing bead such that, when assembled, the bead fits snugly against the bottom edge of the horizontally extending flange.

U.S. Pat. No. 3,690,902 uses yet another method to secure a cake cover to its base. Here, a horizontally and outwardly extending flange is attached to the mouth of the cover. The base, which is usually made of corrugated cardboard and which extends at least as far outward as the outer edge of the flange, is attached to the cover by means of staples.

U.S. Pat No. 3,795,360 discloses of two additional methods of attaching cover to base. In the first method, four vertical indentations, one on each face of the cover, are formed in the side walls of the cover. At precisely the same height, each indentation contains a horizontal slot having the same thickness as the horizontally outwardly extending flanges of the base. To secure the cover to the base, the flange is slipped into the horizontal slots. In the second method disclosed in U.S. Pat. No. 3,795,360, four small oval shaped indentations are located on each side of the cover so that the indentations can be slipped underneath the horizontal flanges, locking the cover to the base.

U.S. Pat. No. 4,375,862 discloses a means of attaching and detaching the cover to the base by rotating the cover clockwise or counterclockwise relative to the base. The method of attaching the cover to the base is essentially similar to the method disclosed in U.S. Pat Nos. 1,978,296 and 3,837,526, with the exception that certain parts of the base has no outward extending flange and certain portions of cover has no inward extending beads. Thus, when the portion with no outward extending flange and no inward extending bead is aligned, the cover easily fits over the base. Once the cover fits over the base, the cover can be turned clockwise or counterclockwise, locking the cover to the base by snugly fitting the bead underneath the flange.

U.S. Pat. No. 4,452,356 discloses an additional method of attaching cake cover to base. Here, food grade adhesive is applied between the outward extending flange of the cover and the corrugated cardboard cake base, thereby attaching the cake cover to the base.

Finally, U.S. Pat. No. 4,197,940 discloses of a method of attaching a cover to a base by redesigning the configuration of the base. The cover disclosed in U.S. Pat. No. 4,197,940 has a simple, outward flaring flange. The base, however, is first connected to a vertically upwardly extending flange which is then connected to a horizontally inwardly extending flange. The cover is affixed to the base by slipping the outward extending flange of the cover underneath the inwardly extending flange of the base.

The above described methods of securing the cover to the base is usually adequate for smaller cakes. However, when the cake is large and heavy, the base is simply not stiff enough to withstand the weight of the cake, and so the base tends to sag in the middle when the entire cake packaging assembly is picked up by holding on to the sides of the base. This deformation of the base tends to cause the cake cover to pop off, despite the fact that the cover is attached to the base by the various fastening means described above. The problem is not solved by holding the cake up from the middle instead of the sides. If the cake is exceptionally large or heavy, the sides may still sag even when the cake is held up from the middle. Furthermore, because of the size and the weight of the cake, holding the cake up from the middle will cause the cake to tip over if the cake holder is not careful balancing the cake. The larger the cake, the more pronounced the above problem becomes.

SUMMARY OF THE INVENTION

It is an object of the present invention to provide a novel means of packaging large and heavy cakes.

It is another object of the present invention to provide a method of quickly securing a cake cover to a base.

It is another object of the present invention to provide a simple method of securing a cake cover to a base.

In satisfaction of these related objectives, Applicant's present invention provides a novel method of packaging large and heavy cakes on a tray under a clear plastic cover by the addition of a small external clip and the addition of small slits located at the bottom of the cake base.

The entire packaging assembly comprises a cake base made of corrugated cardboard, a cake cover (preferably plastic and see-through), two spring loaded clips, and two slits cut into the bottom side of the corrugated cake base at the place where the spring loaded clips are to be attached to the cake base. The cake base can be round or rectangular and can be of any size. However, because the preferred embodiment of the present invention is that of a cake packaging assembly for rectangular cakes. The cake base described in detail below is rectangular in shape. Although the cake base may be made of any generally stiff material, in the preferred embodiment, the cake base is made of corrugated cardboard.

Two parallel and apart slits are cut into the bottom surface of the cake base parallel to the corrugation of the board, at a location where the spring loaded clips are to be attached to the base. The slits must be shorter than the length of the board but longer than the length of the clips. Furthermore, the distance of the slits from the edge of the board must be no farther than the width of the clips.

In its preferred embodiment, the cake cover is made of a plastic, see-through material and is comprised of a vertically extending outwardly flaring flange attached around the bottom perimeter of the base, four generally vertical sides, and a generally flat top. The top and sides of the cover have a series of raised built-in grooves. These grooves serve as reinforcing means to enable the cover to withstand the deformatory forces exerted by the weight of the cake onto the cake cover once the cover is affixed to the base. The cake cover should be at least as large as the cake base, but not so small that the spring loaded clips cannot clip the flange to the cake cover. The cake cover opens downward, with the bottom flange attached generally perpendicularly to the perimeter of the side walls of the cake cover.

At least two spring loaded clips are required for the present invention. Each clip has an upper part, a middle connecting part, and a lower part. At its distal end, the generally rectangular upper part of each clip is connected to a semicircular blunt end. At its proximate end, the upper part of the clip is attached to the middle part at a generally downward slant. The attachment between the upper and middle part is spring loaded so that a downward force will be exerted by the upper part onto any object that is placed between the upper part and the lower part. In addition to being connected to the upper part, the middle part is also connected generally perpendicularly to the lower part. The lower part is generally rectangular in shape and is wider than the upper part. The lower part is connected perpendicularly at its distal end to an elongated sharp edge. The elongated sharp edge has rectangular sides but is triangular in its cross section. All parts of the clip have generally smooth surfaces both on their inside and outside surface.

To assemble the present invention, a finished cake is first placed onto a cake base. Then, the cake cover is affixed to the base by using any one of the currently available means such as food grade glue or any interlocking design built in the cake cover and/or base. The clips are then attached to the packaging assembly, with the inside surface of the upper part of the clips resting against the outer surface of the external flange, with the inside surface of the lower part of the clips resting against the lower surface of the cake base, and with the elongated sharp edge fit snugly into one of the slits cut in the bottom surface of the cake base.

By holding together the cake base and cake cover, the clips are able to transfer the downward force exerted onto the base by the large cake to the cake cover which is structurally designed to be able to withstand larger deformation forces. Furthermore, the small slits cut into the bottom side of the cake base provide a more substantial grip for the elongated sharp edge to attach to the base and prevent the clips from accidentally popping out of place. In this manner, Applicant's invention permit its practitioner to handle large cakes by holding only on to the sides of the cake base without the base sagging and separating from the cover.

DETAILED DESCRIPTION OF THE PREFERRED EMBODIMENT

Figure 1:
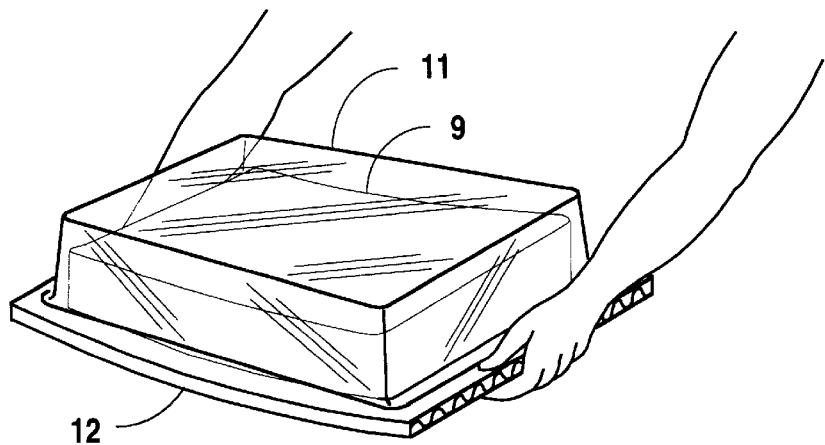
FIG. 1 is a perspective view of the prior art illustrating the problems encountered when large cakes are picked up by the ends.

Previously, large cakes (9) were normally mounted on a cake base (12) made of corrugated cardboard and were covered by a cake cover (11) normally made of clear plastic material as shown in FIG. 1. However, even though the cake cover (11) is attached to the cake base (12) by staples or glue at the corners, the middle will sag as illustrated in FIG. 1. This is very undesirable from both the merchant's and the customer's standpoint.

Figure 2:
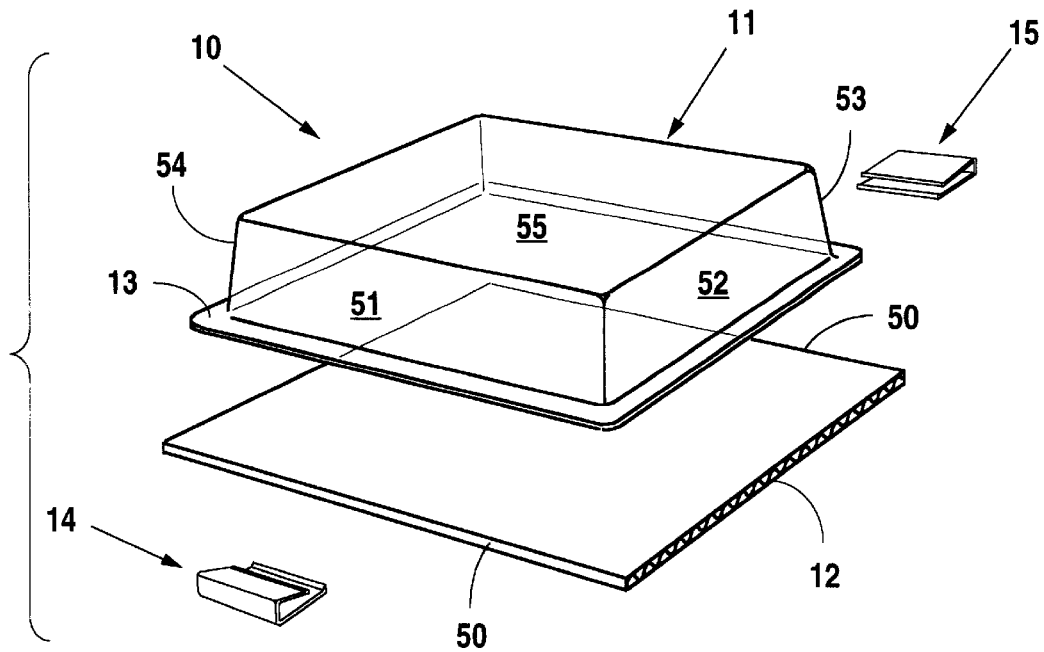
FIG. 2 is an exploded perspective view of the preferred embodiment of the present invention.

FIG. 2 shows a perspective view of the preferred embodiment of the present invention. Cake packaging assembly (10) generally consists of cake base (12), cake cover (11), and two spring loaded clips (14) and (15) removably attached to base (12) and flange (13).

In the preferred embodiment, cake base (12) is generally rectangular and made of corrugated cardboard, with the corrugation spanning the length of the base. Although cake base (12) is made of corrugated cardboard in the preferred embodiment, any lightweight material capable of supporting a load can be used as a base.

Figure 5:
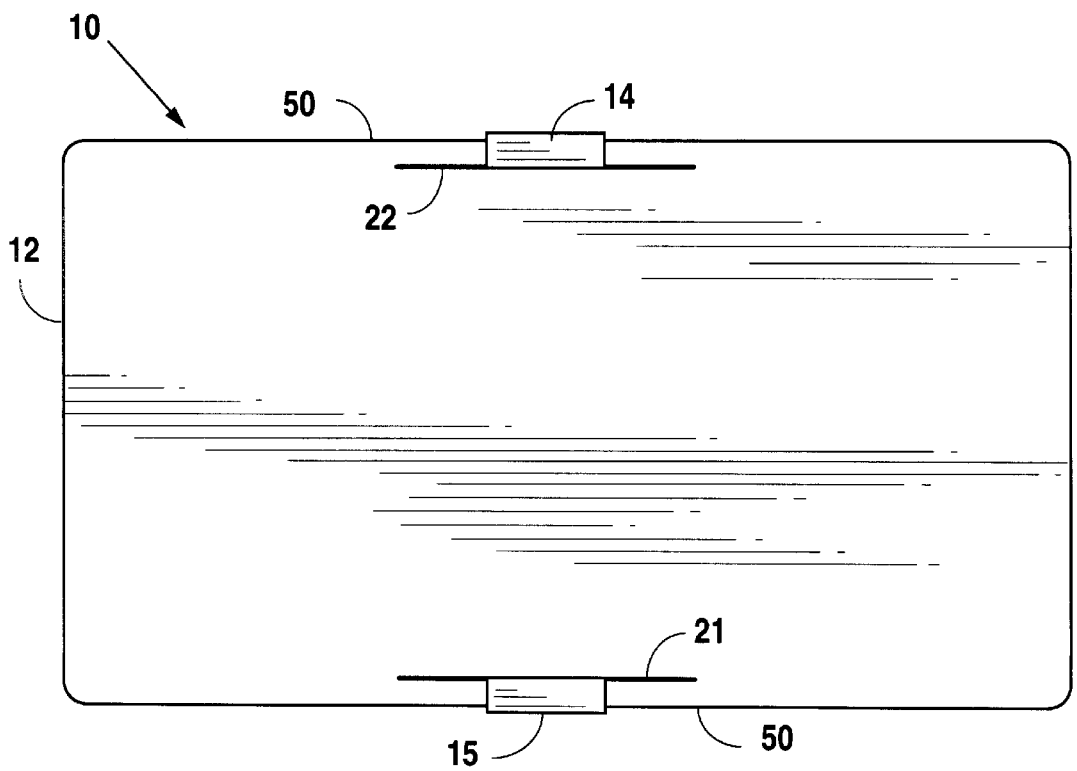
FIG. 5 is a bottom view of the preferred embodiment of the invention.

Two slits, (21) and (22) shown in FIG. 5, are cut into the bottom of cake base (12). In the preferred embodiment, slits (21) and (22) are cut parallel and apart near the lengthwise edge (50) of base (12) and centered at the midpoint of the lengthwise edge of base (12). Slits (21) and (22) are always cut so that they are no farther from the lengthwise edge of base (12) than the width of clips (14) or (15). Although in the present embodiment the midpoint of slits (21) and (22) correspond with the midpoint of the lengthwise edge of base (12), slits (21) and (22) can be of any length and can be located at any place along the bottom side of base (12) as long as slits (21) and (22) will allow clips (14) and (15) to be placed near the midpoint of the lengthwise edge (50) of base (12), are shorter than the length of the base (12), are at least equal to the length of clips (14) and (15), and are cut in the direction of the corrugation of the cardboard. Finally, slits (21) and (22) must be cut deep enough to allow at least a substantial portion of the elongated sharp edges of clips (14) and (15) to penetrate the surface of the bottom side of cover (12) so that the elongated sharp edges (20) of clips (14) and (15) can fit snugly into slits (21) and (22), thus preventing clips (14) and (15) from accidentally sliding out of place.

Figure 4:
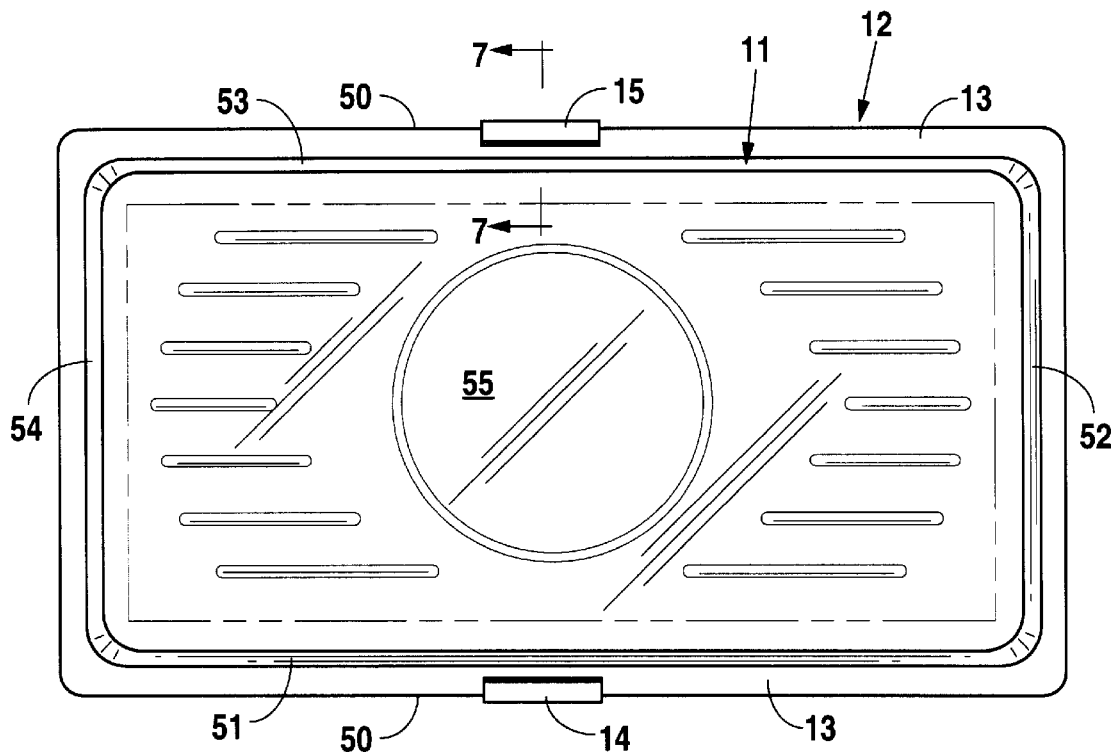
FIG. 4 is a top view of the preferred embodiment of the invention in its preferred environment.
Figure 6:
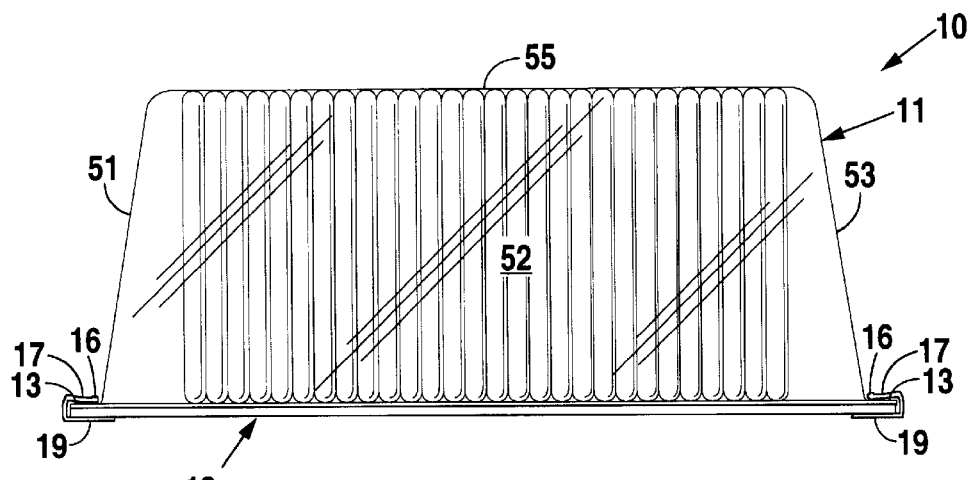
FIG. 6 is a end view of the preferred embodiment of the invention.

FIG. 2 also shows cake cover (11), which opens downwards. In its preferred embodiment, cover (11) consists of bottom flange (13), four generally vertical walls (51, 52, 53, and 54), and one generally horizontal top (55). The bottom of cake cover (11) must be of the same general dimension as cake base (12). Further, cake cover (11) can never be larger than cake base (12) or so much smaller than cake base (12)

that, when clipped, the upper and lower parts of clips (14) or (15) cannot simultaneously come into contact with both flange (13) and cake base (12). Flange (13) is generally horizontal and flares outward and away from the lower opening of cover (11). Flange (13) is made of the same material as cake cover (11) and is molded as a part of cake cover (11). Flange (13) extends generally perpendicularly along the lower edge of the vertical walls of cover (11). The vertical walls (51, 52, 53, and 54) extend generally perpendicularly to the top (55) of cover (11). Cake cover (11) contains a series of built in grooves on its top (55) and along the vertical walls (51, 52, 53, and 54). One groove, in the shape of a circle, is located at the center of the top of cover (11) as illustrated in FIGS. 4 and 6. Furthermore, two sets of linear grooves of different lengths are located parallel and apart from each other along the length of the top (55) of cover (11). In addition, parallel and apart linear grooves of different sizes are located vertically along each walls (51, 52, 53, and 54) of cover (11).

Figure 3:
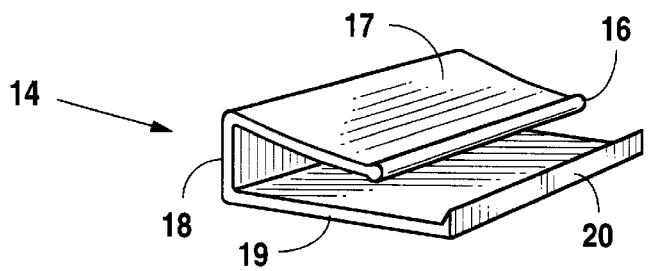
FIG. 3 is a perspective view of a clip used to secure cake cover to base.

FIG. 3 is a perspective view of spring loaded clip (14), which is similar in construction to spring loaded clip (15). For ease of description, only clip (14) will be discussed in detail below.

Clip (14) generally consists of an upper part (17), a middle connecting part (18), and a lower part (19). More specifically, upper part (17) is flat, is generally rectangular in shape, and is connected to semicircular blunt end (16) at its distal end. Semicircular blunt end (16) is a generally cylindrical solid connected along its entire length to the distal end of upper part (17). At its proximate end, upper part (17) is flexibly connected to middle connecting part (18) in such a manner that, when not in use, upper part (17) slants slightly towards lower part (19).

When properly clipped, upper part (17) connects generally perpendicularly to middle connecting part (18) and exerts a downward force on any surface resting against semicircular blunt end (16). Middle connecting part (18) is flat, is generally rectangular in shape, and is flexibly connected at its upper end to upper part (17) and at its lower end to lower part (19). Lower part (19) is flat and generally rectangular in shape but is wider than upper part (17). Lower part (19) connects generally perpendicularly to middle connecting part (18) at its proximate end and connects generally perpendicularly at its distal end along the entire length of the blunt end of elongated sharp edge (20). Elongated sharp edge (20) is generally rectangular at its surface but generally triangular at its cross section. The height of elongated edge (20) must exceed the thickness of lower part (19). Upper part (17), middle connecting part (18), lower part (19), and elongated sharp edge (20) all have generally smooth inner and outer surfaces.

Clips (14) and (15) can be constructed of any semi-rigid and spring loaded material such as plastic.

FIG. 4 shows a top view of the cake packaging assembly (10) after cake cover (11) has been properly attached to cake base (12) and after clips (14) and (15) have been properly clipped to the longitudinal sides of cake packaging assembly (10). The upper parts of clips (14) and (15) are placed over flange (13), and the lower parts of clips (14) and (15) are placed underneath the bottom side of base (12). Further, clips (14) and (15) are placed near the midpoint of the lengthwise edges (50) of cake packaging assembly (10).

FIG. 5 shows a bottom view of packaging assembly (10) after cake cover (11), cake base (12), and clips (14) and (15) have been properly assembled. As described previously, two parallel and apart slits, (21) and (22), are located on the bottom of cake base (12) parallel to the corrugation of cake base (12). Slits (21) and (22) can be of any length less than the length of the longer sides of base (12) but at least equal to the length of clips (14) and (15). Further, slits (21) and (22) must be cut no farther from the closest edge of cake base (12) than the width of the bottom part of clip (14) or (15). In addition, slits (21) and (22) must be placed at a location that will allow clips (14) and (15) to be positioned at or near the midpoint of the longer sides of cake base (12). Finally, slits (21) and (22) must be cut deep enough to allow at least a substantial portion of the elongated sharp edges (20) of clips (14) and (15) to penetrate the surface of the bottom side of cake cover (12) so that the elongated sharp edges (2)0 of clip (14) or (15) can fit snugly into slits (21) and (22), thus preventing clips (14) and (15) from accidentally sliding out of place.

FIG. 6 shows an end view of cake packaging assembly (10). The semicircular blunt ends (16) of upper part (17) of clips (14) and (15) rest snugly against flange (13) of cake cover (11). Further, the lower parts (19) of clips (14) and (15) rest snugly against the bottom of base (12).

Figure 7:
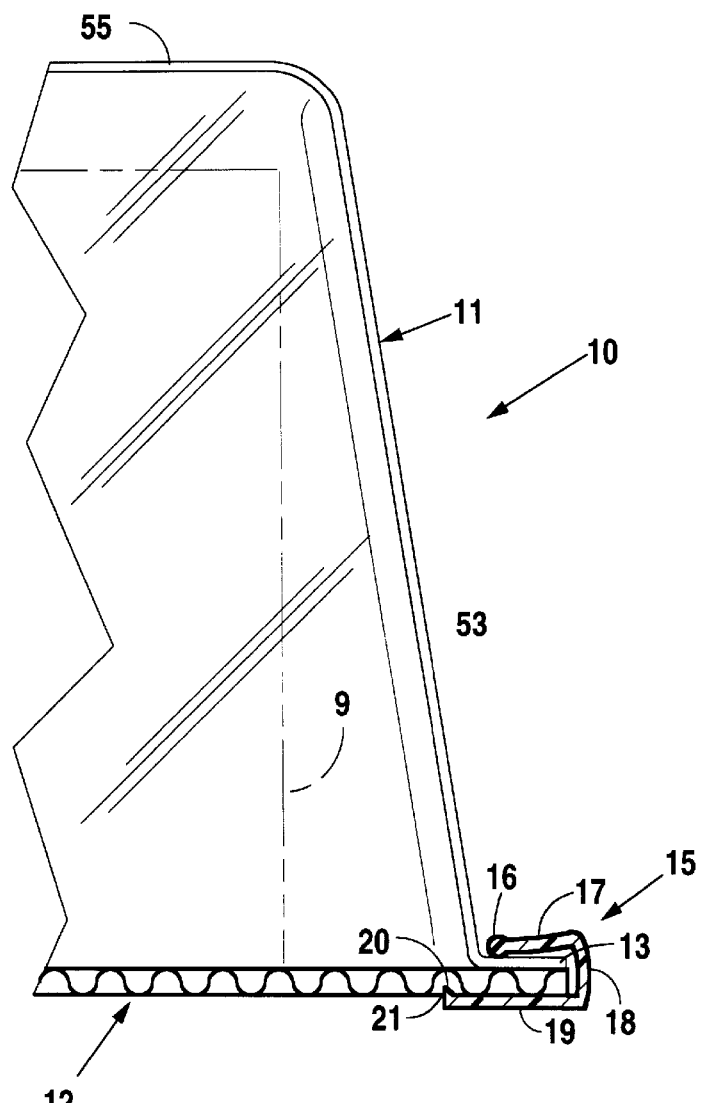
FIG. 7 is across sectional view of the preferred embodiment of the invention, showing the manner by which the clip is fastened to the side of the cake base and cake cover.

FIG. 7 is a cross section view of clip (14) after it has been properly attached to the cake packaging assembly (10). Semicircular blunt end (16) makes contact with and exerts a generally downward force on flange (13) while elongate sharp edge (20) extends into slit (21) and hooks into base (12), thereby securely attaching clip (14) to packaging assembly (10).

In order to assemble the present invention so that a person can carry a large cake (9) by simply holding on to the ends of cake base (12) using both hands, a cake (9) is first mounted to cake base (12) in the conventional manner. After mounting the cake (9) onto cake base (12), cake cover (11) is attached to cake base (12) by using glue or any other conventional method. Lastly, clips (14) and (15) are mounted into place by securing the upper part (17) of clips (14) and (15) against flange (13) and by securing the elongated sharp edge (2) of the lower part (19) of clips (14) and (15) into slits (21) and (22). After affixing clips (14) and (15), the cake (9) is properly packaged and is ready for an individual to pick up by simply holding on to the edges of cake base (12) without needing to worry about any sagging at the middle of cake base (12).

Other alternative embodiments of cake packaging assembly (10) exist. Although the preferred embodiment described above is for packaging rectangular cakes, the present invention can also be adapted to package round cakes. Round cakes would also be packaged in an assembly consisting of a cake base, a cake cover, and at least two cake clips of the same dimension and structure as clips (14) and (15) described above. The cake base and cake cover for packaging round cakes would be circular in shape and can be made of any material, although corrugated cardboard is the preferred material for the base and see through plastic is the preferred material for the cover. As with the rectangular cake bases, at least two slits must be cut into the bottom of the cake base. These slits must always be cut in the same direction as the corrugation of the base. In its preferred embodiment, the circular cake cover is made of see-through plastic, with the cover's rigidity enforced by various grooves located at the top and side walls of the cover. A horizontal outward flaring flange would be attached perpendicularly along the perimeter of the mouth of the cake cover. Here, the clips are assembled in the same manner as for rectangular cake packages.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A cake packaging assembly for packaging large and heavy cakes comprising:
    a cake base;
    at least two slits cut into said cake base, each of said slits being on opposite sides of said cake base;
    a cake cover with an outward flaring flange member detachably secured to said cake base; and
    at least two clips detachably secured to said base and said cake cover with one inner surface of said clips resting snugly against an upper surface of said flange member of said cake cover and an inner surface of said clips secured into said slit of said cake base, wherein said clips provide support for said cake base so as to prevent collapse of said cake base from size or weight of a cake;
the clips further including;
    a semicircular blunt end;
    an upper part connected at a distal end to said semicircular blunt end;
    a middle connecting part whose upper end is flexibly connected to a proximate end of said upper part and whose lower end is flexibly connected to a proximate end of a lower part; and
    said lower part whose distal end is connected to a blunt end of an elongated sharp edge, wherein said clips are spring loaded and allows said sharp edge to lie snugly in said slit so as to prevent sliding of said clips and said cake base.

* * * * *